No. 779,115. PATENTED JAN. 3, 1905.
J. F. BOWERS.
CULTIVATOR OR PLOW FRAME.
APPLICATION FILED AUG. 8, 1904.
2 SHEETS—SHEET 2.
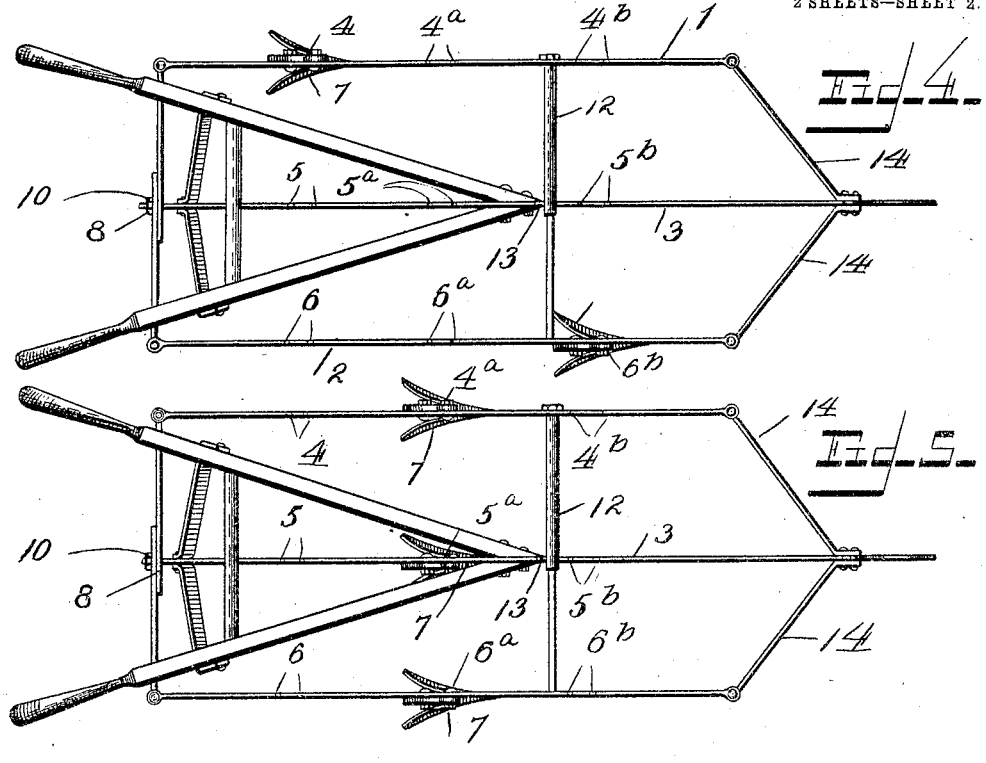
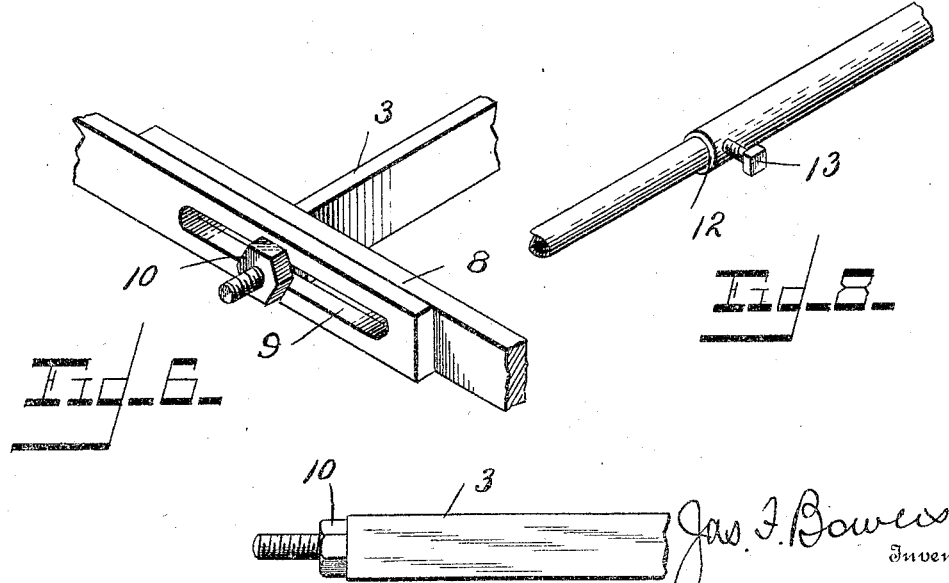

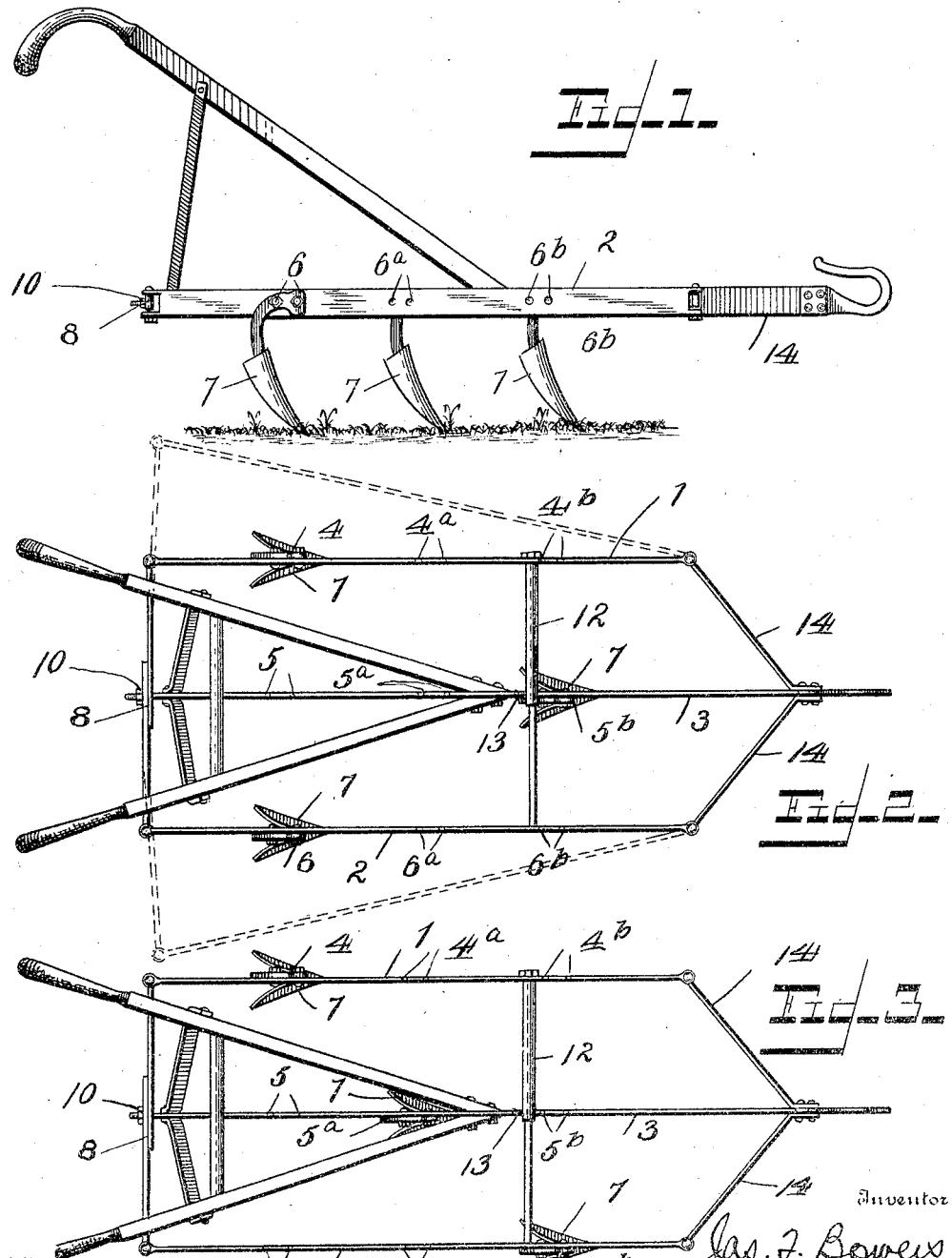

No. 779,115.

Patented January 3, 1905.

UNITED STATES PATENT OFFICE.

JAMES F. BOWERS, OF SANFORD, NORTH CAROLINA.

CULTIVATOR OR PLOW FRAME.

SPECIFICATION forming part of Letters Patent No. 779,115, dated January 3, 1905.

Application filed August 8, 1904. Serial No. 220,150.

*To all whom it may concern:*

Be it known that I, JAMES FRANKLIN BOWERS, a citizen of the United States, residing at Sanford, in the county of Moore and State of North Carolina, have invented new and useful Improvements in Cultivator or Plow Frames, of which the following is a specification.

This invention has relation to plows and plow-frames, and particularly to such plow-frames as are adapted to provide three plows so disposed that the middle plow shall form the furrow, while the side plows shall operate to cover in, no matter whether the side plows precede the middle plow or trail after it.

It is the object of my invention to provide a plow-frame provided with three plows which may be adjusted in the frame in such manner as to perform with completeness any of several kinds of work in the formation of rows for planting or opening or covering in or cultivating what is therein growing.

To these ends the invention consists of three parallel bars, a rear end bar adjustable as to its length and adapted to be fixed in adjusted position by means connected with the rear end of the central bar to fix and maintain the said adjustment, a transverse extensible central bar that may accommodate itself to the adjustment of the rear end bar, and inclined front bars converging on the extension of the central longitudinal bar, the forward ends of the side bars having a hinged or flexible connection with the said side bars and the latter and the central bar being each provided with three separate means of connecting a plow therewith, but not more than one plow being attached to a bar at a time when the implement is in operation, though the point of attaching the plow may be arbitrary and not the same at each successive time, all as I will proceed to set forth more fully hereinafter.

Reference is to be had to the annexed drawings or diagrams and to the symbols of reference marked thereon, like symbols designating like parts or features, as the case may be, wherever they occur.

Figure 1 is a side elevation of my improved plow or cultivator, showing the handles for controlling the same and means to which the draft-clevis may be attached. Fig. 2 is a diagram in plan, showing an arrangement of the side plows to form a ridge-row and a trailing central plow to open a furrow in it, into which seeds or bulbs to be planted may be dropped. Fig. 2 shows an arrangement by which the central plow may form a furrow and the two side plows trailing may cover the same in to a certain extent. Fig. 3 shows the same arrangement of plows, but one of the side plows operating in advance of the central plow and the other trailing. Fig. 4 shows the side plows as operating at different points in cross-section without the central plow, as in the act of cultivating. Fig. 5 shows a similar arrangement of the side plows in the act of cultivating or covering in a row without the central plow, the side plows being arranged in the same plane in cross-section. Fig. 6 shows the arrangement of the two end bars and the manner of adjusting the same in connection with the longitudinal central bar, and Fig. 7 shows the rear end of the latter. Fig. 8 shows how the central transverse bar is made extensible.

The numeral 1 designates one of the side bars, and 2 the other, while 3 designates the central longitudinal bar. Each of said bars is provided with three places 4, $4^a$, and $4^b$, and 5, $5^a$, and $5^b$, and 6, $6^a$ and $6^b$, to which a plow 7 may be attached—that is, not more than one plow, 7, at a time.

In the construction of the frame I propose to make the rear end bar 8 adjustable longitudinally, so as to lengthen or shorten it, and thus widen or narrow the frame. I do this by dividing the bar 8 and providing each end with a slot 9, so that the slotted ends may overlap, and the extreme end of the central bar 3, which may be of iron, is turned down and screw-threaded to receive a nut 10. The turned-down portion 11 of the central bar is passed through the slots 9, and the nut 10 is turned up thereon to secure the two divided ends together in the position desired.

The central transverse bar 12 may be made of hollow rods, so that one may telescope the other and the two be fixed in any adjusted position by a set-screw 13, or other suitable ways for adjusting the central bar may be provided.

From the forward ends of the side bars there are two bars 14, which come together on angular lines and are provided with a hook or other means for receiving a clevis, by which the implement may be drawn by a team.

In the description of the diagrams of the drawings it was indicated how the plows or cultivator-shoes might be arranged and the results of such arrangements. However, I am not bound to these arrangements nor to the exact mode of operation which the said arrangements will effect. The fact is, however, that I do not propose to employ more than three plows at a time, one on each longitudinal bar, while I propose in all cases to have the bars provided with the plow-receptacles mentioned, so that I can avail myself of the use thereof or abandon the same to disuse.

I am aware that it is not new to make the side bars of plows adjustable laterally. Hence I do not claim that principle broadly, nor do I claim a cultivator-frame broadly provided with teeth irrespective of the number throughout.

My invention is designed to meet the various wants of farmers and planters in forming, covering, uncovering, and cultivating rows of farm products, as it has been my effort hereinbefore to describe.

What I claim as my invention is—

A cultivator, or plow frame, having three longitudinal and central and rear transverse bars, each longitudinal bar being provided with three places and means for the affixing of a plow or cultivator tooth, and one tooth only affixed to each bar, in combination with the rear bar having slotted and overlapping ends with the central longitudinal bar turned down at its extreme end and extending into said slot, a nut on the end to receive it in place, and a central cross-bar divided centrally, the said latter bar consisting of a hollow rod one portion smaller than the other, whereby it may be telescoped into the larger part, and a set-screw for fixing the two telescoped parts in place, substantially as and for the purposes hereinbefore set forth.

In testimony whereof I have signed my name to this specification in the presence of two subscribing witnesses.

JAMES F. BOWERS.

Witnesses:
S. M. JONES,
JOHN R. BOWERS.